May 7, 1946. T. BACKUS ET AL 2,399,613
REMOTE CONTROL FOR AUTOMOTIVE VEHICLE TRANSMISSIONS
Filed July 1, 1944 3 Sheets-Sheet 1

Inventors
Thomas Backus
Clarence H. Parrish Jr.

May 7, 1946.　　　T. BACKUS ET AL　　　2,399,613
REMOTE CONTROL FOR AUTOMOTIVE VEHICLE TRANSMISSIONS
Filed July 1, 1944　　　3 Sheets-Sheet 2
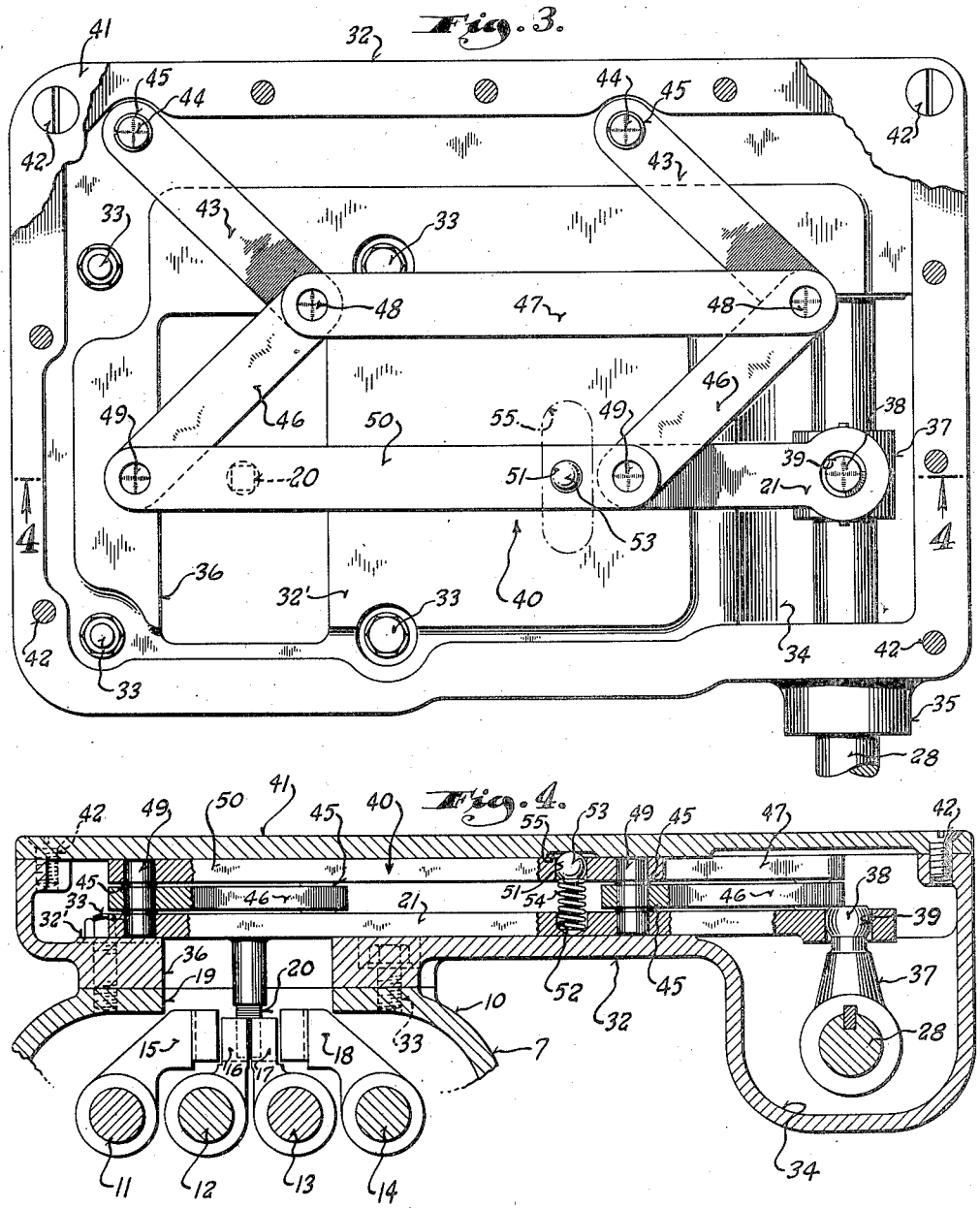
Inventors
Thomas Backus
Clarence H. Parrish Jr.
By Milton Jones
Attorney May 7, 1946. T. BACKUS ET AL 2,399,613
REMOTE CONTROL FOR AUTOMOTIVE VEHICLE TRANSMISSIONS
Filed July 1, 1944 3 Sheets-Sheet 3

Inventors
Thomas Backus
Clarence H. Parrish

By
Attorney

Patented May 7, 1946

2,399,613

UNITED STATES PATENT OFFICE 2,399,613

REMOTE CONTROL FOR AUTOMOTIVE
VEHICLE TRANSMISSIONS

Thomas Backus, Peoria, Ill., and Clarence H.
Parrish, Jr., Kalamazoo, Mich., assignors to
Fuller Manufacturing Co., Kalamazoo, Mich.,
a corporation of Delaware Application July 1, 1944, Serial No. 543,130

6 Claims. (Cl. 74—473)

This invention relates to remote controls for automotive vehicle transmissions and especially those employed in trucks, buses, tanks and other large motor driven vehicles where the driver's compartment is generally a substantial distance from the transmission.

One of the disadvantages of such remote controls heretofore available was that they required considerable room above the conventional transmission housing. This not only entailed making special provision for the control mechanism in the design of the truck or other vehicle with which the control was used, but it also robbed the vehicle of precious space.

It is therefore an object of this invention to provide a remote control for transmissions which is exceptionally compact and neatly contained within a shallow case mounted on the transmission housing and occupying hardly more space than an ordinary cover plate.

Another problem encountered in the use of remote controls of this character results from the inevitable twisting and weaving to which the chassis of all road vehicles are subjected. In an effort to achieve flexibility adequate to meet this situation, remote controls of the past in some instances have been connected with the manually operable gear shift lever by flexible cables as distinguished from more reliable and less expensive solid shafts and linkage.

It is therefore another object of this invention to provide a remote control of the character described which through the use of a novel, simple mechanical motion enables the use of solid shafts and linkage between the control mechanism proper and the manually operable gear shift lever. In this connection, it is another object of the present invention to provide a remote control of the type here involved in which all motion of the manually operable gear shift lever is translated into proper gear shifting motion on the part of the control proper through a single operating connection.

With a view toward effecting maximum compactness and simplicity, this invention has as another of its objects to provide a control mechanism wherein the actual gear shifting motion is imparted to the conventional shifter arms of the transmission by means of a flat actuating bar constrained to planar motion across the top of the transmission, and actuated by oscillation and axial shifting of a single operating shaft connecting the control with the manually operable gear shift lever.

In transmissions of the type with which this invention is concerned, "reverse" and the "overdrive," which is generally included, lie outside the normal range of motion of the gear shifting mechanism; and to guard against actuation of the gear shifting mechanism into these extreme positions during normal operation, some controls include a manually releasable blocking device which must be first released before the mechanism can be shifted into either of these extreme positions. In other cases, spring held obstructions lie in the path of the gear shift actuator, so that when shifting to either of these extreme positions substantial additional effort is required to overcome the spring pressure holding these obstructions.

With a view toward overcoming the disadvantages inherent in these past expedients for preventing accidental shifting into the extreme positions, it is another object of this invention to provide a simple detent which defines the limits of the shifting range with sufficient indication to the driver but without requiring excessive force to overcome whenever occasion requires shifting into either one of these extreme positions.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 3 is a top plan view of the control unit per se, the major portion of its cover being broken away;

Figure 4 is a transverse sectional view taken through Figure 3 generally on the plane of the line 4—4, but with parts that are shown in elevation partially broken away and in section.

Figure 1:
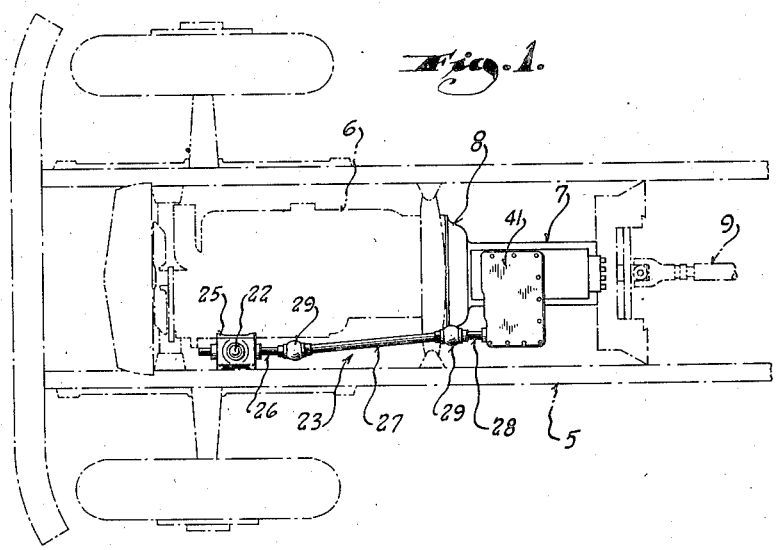
Figure 1 is a top plan view of the front end or forward portion of a motor vehicle chassis illustrating one application of this invention.
Figure 2:
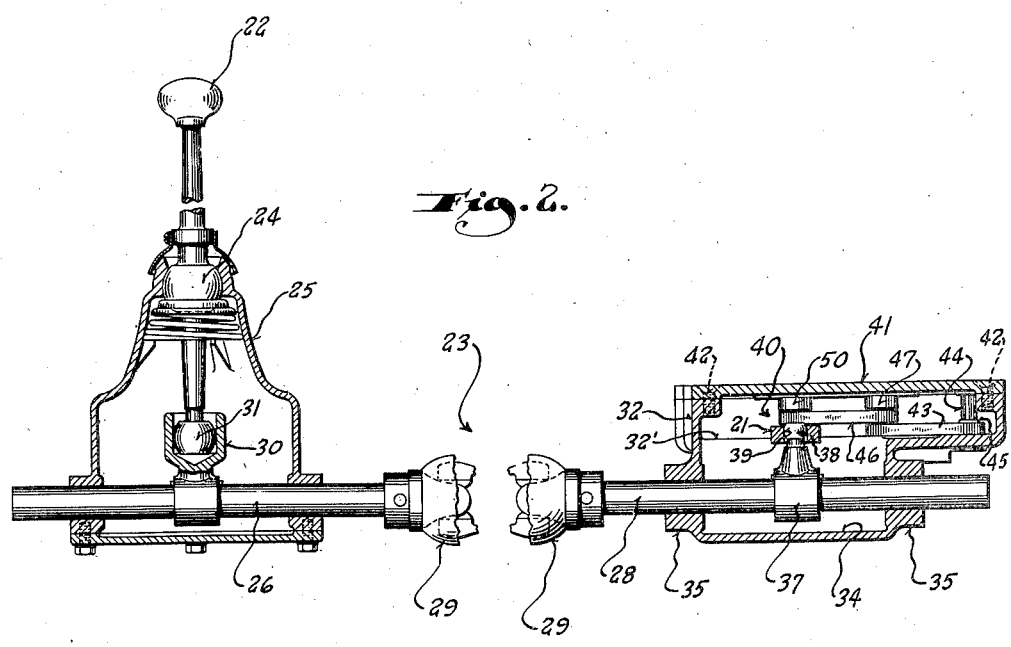
Figure 2 is a view, partly in transverse section and partly in elevation, of the remote control mechanism, the medial portion of its connecting shaft being broken away.

Referring now more particularly to the accompanying drawings, in which like numerals indicate like parts throughout the several views, the numeral 5 designates the chassis frame of a conventional bus or truck having an engine 6 at its forward end connected with the rear driving wheels (not shown) through a transmission mechanism 7, a conventional clutch 8 and a driving shaft 9. The embodiment of the invention illustrated is one wherein the driver's seat or cab is mounted directly above and somewhat forwardly of the engine in a front engine powered vehicle. However, it should be understood that the invention can be employed with any type of motor vehicle in which the shifting of the transmisson gears must be controlled from a remote point.

The transmission 7 is of any conventional design and includes a housing 10 enclosing the customary gearing (not shown) adapted to be controlled or shifted into selective ratios by longitudinal motion of the shifter rods 11, 12, 13 and 14. These shifter rods have upstanding arms 15, 16, 17 and 18, respectively, secured thereto, the outer ends of which are readily accessible through an opening 19 in the top of the housing 10. All of the outer ends of the arms 15—18 are bifurcated to receive an actuator 20 by which the rods may be selectively slid back and forth. The slots in the two middle arms 16 and 17 are transversely open to permit the actuator 20 to pass therethrough and into the slots of the adjacent outer arms 15 or 18 when all the arms are in transverse alinement. When the arms are so aligned the transmission is in neutral.

The normal forward driving speeds, namely, "first," "second," "third" and "fourth" are controlled by the two middle shifter rods 12 and 13. The rod 11 controls the "overdrive" and the rod 14 controls "reverse."

To move any one selected shifter rod the actuator 20 must be fully engaged in the slot of its respective arm. Thus, for the transmission to be placed in "first" gear the actuator 20 must be moved from its neutral position partially engaged with both middle arms 16 and 17 along a defined path which carries it transversely into full engagement with arm 16 and then longitudinally of the transmission in a rearward direction, as will be clear from Figure 5. All this, however, is conventional construction.

The remote control which constitutes the subject matter of this invention provides a simple, highly expedient manner of imparting the required motion to the actuator 20. To this end the actuator 20 is fixed to and depends from an actuator bar 21 which is slidable longitudinally and edgewise across the top of the transmission housing. Through longitudinal motion of the actuator bar 21 the actuator 20 is transversely movable into engagement with the shifter arm of any one selected shifter rod, and through edgewise motion of the actuator bar either forward or back, the shifter rod of the arm engaged by the actuator 20 may be slid back and forth as required.

Figure 5:
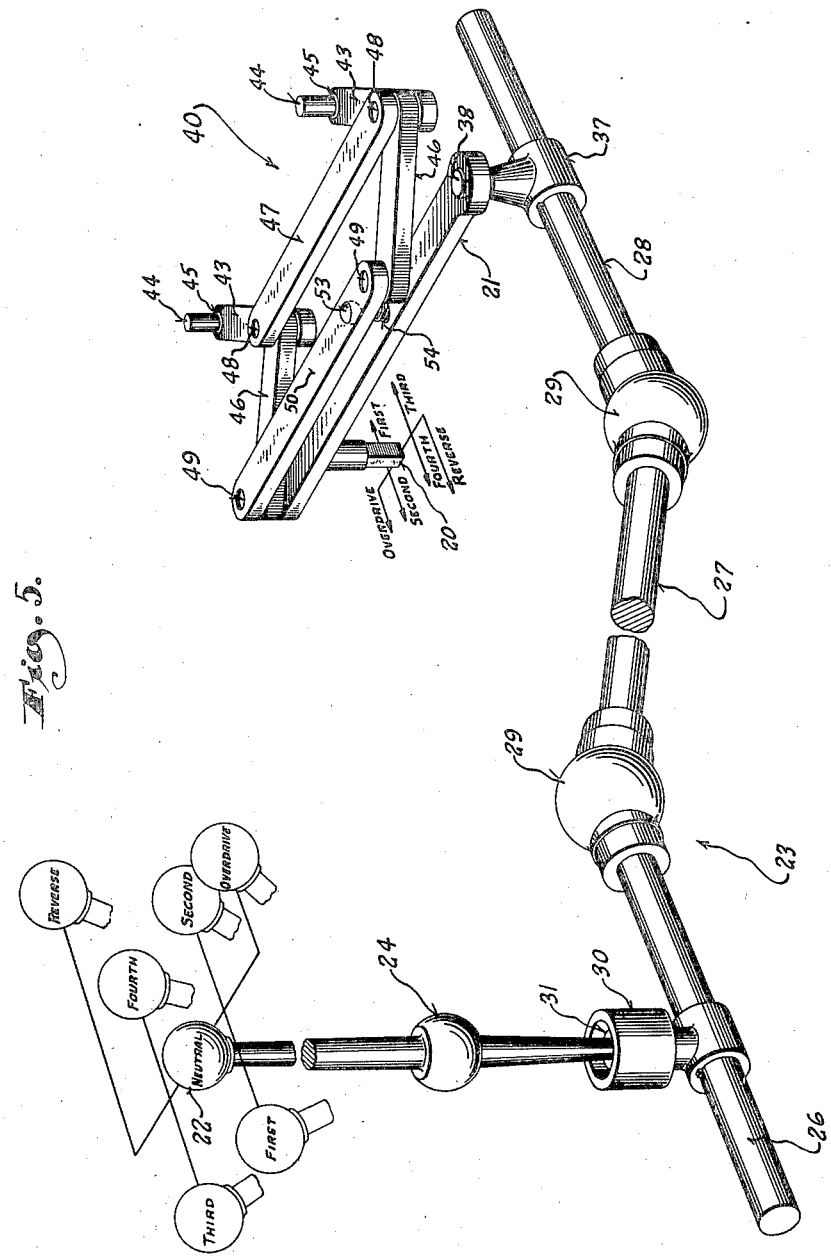
Figure 5 is a perspective, schematic view of the entire remote control mechanism apart from the transmission and motor vehicle.

As particularly illustrated in Figure 5, the stated motions of the actuator bar 21 are imparted thereto by manipulation of a manually controlled gear shift lever 22, the lower end of which is connected to the bar 21 by a single operating connection indicated generally by the numeral 23. The gear shift lever 22 is mounted adjacent to the driver's compartment in the customary manner by means of a ball and socket joint or swivel connection 24 with the upper end of a housing 25. The housing 25 is adapted to be secured to an adjacent portion of the chassis or any other suitable support. The lower end of the lever 22 thus swings from side to side and back and forth as the handle of the lever is moved to its various positions indicated in Figure 5.

The single operating connection 23 between the gear shift lever and the actuator bar 21 consists of a shaft 26 slidably and rotatably mounted in and extending through the lower portion of the housing 25, and an intermediate extension shaft 27 and another shaft 28 constrained to sliding motion and oscillation adjacent to the transmission housing 10. Universal joints 29 connect the three shafts so that such motion of the shaft 28 with respect to the shaft 26 as would be occasioned by the twisting and weaving of a truck chassis is readily accommodated while at the same time longitudinal motion of the shaft 26 and oscillation thereof are directly translated into corresponding movements on the part of the shaft 28.

Within the housing 25 the shaft 26 has a short lever arm 30 fixed thereto. The end of this arm is connected to the adjacent lower end of the manually operable gear shift lever through a ball and socket joint 31. Thus lateral motion of the gear shift lever rocks the shaft 26, while longitudinal back and forth motion of the gear shift lever slides the shaft 26 forwardly and backwardly. The manner in which the corresponding manually produced motions of the shaft 28 are translated into the desired motion of the actuator bar 21 and consequently the actuator 20 constitutes the main feature of this invention.

To have the actuator bar 21 with its actuator 20 follow the motion of the lower end of the gear shift lever and still avoid complicated mechanism and enable the entire control to be housed within a shallow case that occupies not much more space than an ordinary cover plate for the transmission housing, is one of the major problems solved by this invention. To this end the control proper is mounted within a shallow case 32 directly bolted or otherwise secured as at 33 to the transmission housing 10 over the opening 19 therein.

The case 32 is substantially rectangular and projects to one side of the transmission housing. At its end farthest removed from the transmission housing it has a depending well or depression 34 in which the shaft 28 is received, the opposite side walls of the case forming the ends of this well or depression being bored to provide the bearings 35 by which the shaft 28 is constrained to oscillation and sliding motion. It is to be observed that the well or depression 34 adds nothing to the overall height of the control mechanism as it extends down alongside the regular transmission housing 10.

The bottom of the control case 32 has a hole 36 in line with the hole 19 in the top of the transmission housing 10 and has a pad 32' extending slightly up from its inner surface across which the actuating bar 21 slides. The inner end of the bar which carries the downwardly projecting actuator 20 is over the hole 36 so that the actuator may project down into the bifurcated ends of the shifter arms 15, 16, 17 and 18.

The other outer end of the actuator bar 21 is connected to the shaft 28 by a lever arm 37 fixed to the shaft and having a ball end 38 received in a drilled hole providing a socket 39 in the actuator bar.

From the description thus far it is easily seen how oscillation of the shaft 28 shifts the actuator bar 21 longitudinally of itself to move the actuator 20 transversely; but means must be provided to guide the motion of the free end of the actuator bar 21 so that the bar will have only an endwise motion when the shaft 28 is oscillated and an edgewise translating back and forth motion when the shaft 28 is moved axially forward or back. This guiding function is performed by a parallelogram mechanism, indicated generally by the numeral 40, disposed flatwise within the shallow case 32 between its bottom wall and a cover plate 41. The cover plate closes the entire open top of the case and is removably secured in place by screws 42 or the like. As particularly illustrated in Figure 4, the cover plate cooperates with the pad 32' on the bottom wall of the case to confine the parallelogram mechanism and the actuator bar 21 to planar motion.

The parallelogram mechanism consists of two or more equi-length lever arms 43 pivoted to the bottom of the control case by pivot posts 44. The lower ends of these posts are received in suitable sockets in the bottom of the control case, and the upper ends thereof bear against the underside of the cover so that the cover, when in position, holds the pins in place. Snap rings 45 engaged in grooves in the pins directly above the lever arms 43 hold the lever arms down against the pad 32' on the bottom wall of the case.

The free ends of the lever arms have similar lever arms 46 and a connecting link 47 pivoted thereto by pins 48. The distance between the pins 48 is the same as the spacing between the fixed pivot pins 44. Hence, the link 47 and the lever arms 43 in conjunction with the bottom of the case 32 form a parallelogram with one fixed side.

The pivot pins 48 are slightly shorter than the space between the pad 32' on the bottom wall of the case and the underside of the cover and are held against endwise displacement by snap rings 45 received in properly positioned grooves in the pins. The snap rings also serve to space the lever arms 43 and 46 and the link 47 to insure free relative motion of these parts.

The free ends of the lever arms 46 overlie the actuator bar 21 and are pivotally connected thereto by pins 49 similar to the pins 48 and likewise held against axial displacement by snap rings 45. The spacing of the pins 49 along the actuator bar 21 is the same as the parallel distance between the pins 44 and the pins 48. Hence a second parallelogram is defined by the link 47, the lever arms 46 and the intervening portion of the actuator bar 21. This second parallelogram is entirely free for planar movement in all directions within the range of the lever arms 43 and 46, and in all positions thereof the actuator bar 21 remains parallel with a line passing through the axes of the fixed pivot pins 44 and normal to the axis of the shaft 28. Thus when the shaft 28 is shifted axially the actuator bar 21 moves edgewise with a translating motion parallel to the axis of the shaft, and when the shaft is rocked the actuator bar moves endwise in a direction normal to the shaft.

The free ends of the levers 46, in addition to being connected by the actuator bar 21, are joined by an auxiliary link 50 which lies in the same plane as the link 47 and thus slides along the underside of the cover 41, the pins 49 extending up into sockets in the ends of the link 50. This auxiliary link 50 has a hole 51 therethrough in line with a socket 52 in the top of the actuator bar 21. A ball detent 53 received in the hole 51 is urged upwardly into engagement with the underside of the cover by a spring 54 seated in the socket 52. The underside of the cover engaged by the ball detent has a transverse groove 55 in which the ball is received, the length of the groove being such that the ball does not leave the same during endwise motion of the actuator bar from its neutral position illustrated in Figure 4 to effect full engagement of the actuator 20 with either of the shifter arms 16 or 17. To enable the actuator 20 to be engaged with the shifter arms 15 or 18 the ball detent must be carried beyond the ends of the groove 55 thus affording a sufficient indication to the operator that the shifting mechanism is being moved beyond its normal range.

From the foregoing description, taken in connection with the accompanying drawings (particularly Figure 5) the operation of the control will be readily understood by those skilled in this art. It will also be readily apparent that this invention provides a remote control readily applicable to any transmission in which shifter arms are accessible through an opening in the transmission housing, and that such application can be made without modification of the transmission design to specifically provide space for the control; for its shallow, flat-like construction allows the same to be applied over the opening in the transmission housing like an ordinary cover plate and without requiring much more room than such a cover plate.

It will also be evident that this invention enables the control shaft to be as close to the vertical center line as possible, and that the manually produced gear shifting motion is translated into proper movement of the actuator at the transmission in a reliable and essentially direct manner by virtue of the fact that the parallelogram mechanism guides the movement of the actuator bar across the top of the transmission and thus constrains the motion of the actuator 20 through a defined path which faithfully follows the manually produced motion of the gear shift lever.

What we claim as our invention is:

1. A remote control mechanism for transmissions comprising: a base adapted to be mounted on a transmission housing adjacent to an opening therein through which access may be had to the gear shifting members of the transmission; a plurality of equi-length lever arms pivoted to the base at spaced points; a link connecting the free ends of said lever arms and holding said free ends of the lever arms spaced apart substantially the same distance as the spacing between the fixed pivots of the lever arms so that said link and lever arms in cooperation with the base constitute a parallelogram having a fixed side; other equi-length lever arms pivoted to said link at spaced points; a member pivotally connected to the free ends of said other lever arms with the points of pivotal connection thereto spaced the same distance as the pivots of said other lever arms to said link so that said link and said member connected by said other lever arms constitutes a second parallelogram; an actuator for the gear shifting members of the transmission fixed to said member; a shaft slidable and rotatable in bearings fixed with respect to said base and disposed with its axis normal to the parallel sides of the parallelograms; an arm fixed to said shaft and projecting radially therefrom; and a motion transmitting connection between said arm and said member carrying the actuator so that oscillation of the shaft imparts endwise movement to said member to carry the actuator along a path normal to the shaft, while axial movement of the shaft imparts a translating movement to said member parallel to the axis of the shaft to carry said actuator along a path parallel to the shaft axis.

2. A remote control mechanism for transmissions comprising: a base adapted to be mounted on a transmission housing adjacent to an opening therein through which access may be had to the gear shifting members of the transmission; a plurality of equi-length lever arms pivoted to the base at spaced points; a link connecting the free ends of said lever arms and holding said free ends of the lever arms spaced apart substantially the same distance as the spacing between the fixed pivots of the lever arms so that said link and lever arms in cooperation with the the base constitute a parallelogram having a fixed side; other equi-length lever arms pivoted to said link at spaced points; a member pivotally connected to the free ends of said other lever arms with the points of pivotal connection thereto spaced the same distance as the pivots of said other lever arms to said link so that said link and said member connected by said other lever arms constitutes a second parallelogram; an actuator for the gear shifting members of the transmission fixed to said member; a shaft slidable and rotatable in bearings fixed with respect to said base and disposed with its axis normal to the parallel sides of the parallelograms; an arm fixed to said shaft and projecting radially therefrom; a motion transmitting connection between said arm and said member carrying the actuator so that oscillation of the shaft imparts endwise movement to said member to carry the actuator along a path normal to the shaft, while axial movement of the shaft imparts a translating movement to said member parallel to the axis of the shaft to carry said actuator along a path parallel to the shaft axis; and a spring detent having one element thereof movable with said member which carries the actuator and the other element thereof fixed with respect to the base for indicating motion of said member beyond a predetermined range.

3. In a control for a transmission having a plurality of gear shifting members accessible through an opening in the top of the transmission housing: a shallow case mounted on top of the transmission housing over the opening therein, and extending to one side of the transmission housing, the bottom of said case having a hole in line with the opening in the top of the transmission housing and having a depression in its portion overhanging the side of the transmission housing; axially aligned bearings in the end walls of said depression, the common axis of which is parallel with the longitudinal axis of the transmission; a shaft slidable and oscillatable in said bearings; an actuating member within the shallow case constrained to planar movement therein; an actuator on said member extending through the aligned hole and opening into the transmission housing for selective engagement with any one of said gear shifting members; an arm fixed to said shaft and projecting radially therefrom; a connection between said arm and the actuating member; means within the shallow case connected to said actuating member for guiding movement thereof imparted thereto by said arm on the shaft and constraining such movement of the actuating member to a path normal to the shaft axis and transversely of the transmission upon oscillation of the shaft and to a path parallel with the shaft and longitudinal axis of the transmission upon axial shifting of the shaft; and means for oscillating and axially shifting said shaft from a remote point.

4. In a control for a transmission having a plurality of gear shifting members accessible through an opening in the top of the transmission housing: a shallow case mounted on top of the transmission housing over the opening therein and extending to one side of the transmission housing, the bottom of said case having a hole in line with the opening in the top of the transmission housing and having a depression in its portion overhanging the side of the transmission housing; axially aligned bearings in the end walls of said depression, the common axis of which is parallel with the longitudinal axis of the transmission; a shaft slidable and oscillatable in said bearings; an actuating member within the shallow case constrained to planar movement therein; an actuator on said member extending through the aligned hole and opening into the transmission housing for selective engagement with any one of said gear shifting members; an arm fixed to said shaft and projecting radially therefrom; a connection between said arm and the actuating member; means within the shallow case connected to said actuating member for guiding movement thereof imparted thereto by said arm on the shaft and constraining such movement of the actuating member to a path normal to the shaft axis and transversely of the transmission upon oscillation of the shaft and to a path parallel with the shaft and longitudinal axis of the transmission upon axial shifting of the shaft; means for oscillating and axially shifting said shaft from a remote point; and a spring detent having one element thereof movable with said actuating member and the other element thereof stationary with respect to the shallow case for indicating movement of the actuating member beyond predetermined limits and in a direction transversely of the transmission.

5. A remote control mechanism for transmissions comprising: a base adapted to be mounted on a transmission housing adjacent to an opening therein through which access may be had to the gear shifting members of the transmission; a plurality of equilength lever arms pivoted to the base at spaced points; a link connecting the free ends of said lever arms and holding said free ends of the lever arms spaced apart substantially the same distance as the spacing between the fixed pivots of the lever arms so that said link and lever arms in cooperation with the base constitute a parallelogram having a fixed side; other equilength lever arms pivoted to said link at spaced points; a member pivotally connected to the free ends of said other lever arms with the points of pivotal connection thereto spaced the same distance as the pivots of said other lever arms to said link so that said link and said members connected by said other lever arms constitutes a second parallelogram; an actuator for the gear shifting members of the transmission fixed to said member; and means for operating said member and the actuator thereon to effect selection of different gear ratios including an element rotatable on and slidable along a fixed axis, and a motion transmitting connection between said member and said rotatable and slidable element whereby oscillation of said element imparts movement to said member to carry the actuator in one direction along a defined path, while sliding movement of said element along its axis of rotation imparts motion to said member to carry the actuator along a second defined path substantially at right angles to said first mentioned path.

6. A remote control mechanism for transmissions comprising: a base adapted to be mounted on a transmission housing adjacent to an opening therein through which access may be had to the gear shifting members of the transmission; a plurality of equilength lever arms pivoted to the base at spaced points; a link connecting the free ends of said lever arms and holding said free ends of the lever arms spaced apart substantially the same distance as the spacing between the fixed pivots of the lever arms so that said link and lever arms in cooperation with the base constitute a parallelogram having a fixed side; other equilength lever arms pivoted to said link at spaced points; a member pivotally connected to the free ends of said other lever arms with the points of pivotal connection thereto spaced the same distance as the pivots of said other lever arms to said link so that said link and said member connected by said other lever arms constitutes a second parallelogram; an actuator for the gear shifting members of the transmission fixed to said member; a gear shift lever; and a motion transmitting connection between the gear shift lever and said member whereby lateral motion of the gear shift lever is translated into movement of said member and the actuator thereon in one direction along a defined path, while back and forth motion of the gear shift lever imparts movement to said member and actuator along a second defined path substantially at right angles to said first mentioned path.

THOMAS BACKUS.
CLARENCE H. PARRISH, Jr.